US012676339B2

(12) United States Patent
Mizuno et al.

(10) Patent No.: US 12,676,339 B2
(45) Date of Patent: Jul. 7, 2026

(54) SOLID ELECTROLYTE MATERIAL AND BATTERY USING SAME

(71) Applicant: Panasonic Intellectual Property Management Co., Ltd., Osaka (JP)

(72) Inventors: Keita Mizuno, Osaka (JP); Takashi Kubo, Hyogo (JP); Tetsuya Asano, Nara (JP); Takehiro Tanaka, Hyogo (JP); Kensuke Wakasugi, Tokyo (JP); Tomoyuki Komori, Osaka (JP); Takahiro Hamada, Osaka (JP); Mikiya Fujii, Osaka (JP); Akihiro Sakai, Nara (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 707 days.

(21) Appl. No.: 18/097,809

(22) Filed: Jan. 17, 2023

(65) Prior Publication Data

US 2023/0155170 A1 May 18, 2023

Related U.S. Application Data

(63) Continuation of application No. PCT/JP2021/019273, filed on May 20, 2021.

(30) Foreign Application Priority Data

Jul. 22, 2020 (JP) ................................ 2020-125309

(51) Int. Cl.
*H01M 10/0562* (2010.01)
*B05B 9/04* (2006.01)

(52) U.S. Cl.
CPC ....... *H01M 10/0562* (2013.01); *B05B 9/0413* (2013.01); *H01M 2300/008* (2013.01)

(58) Field of Classification Search
CPC ........... H01M 10/052; H01M 10/0525; H01M 10/054; H01M 10/0562; H01M 2300/008; Y02E 60/10
See application file for complete search history.

(56) References Cited

U.S. PATENT DOCUMENTS

2012/0301796 A1    11/2012    Ohtomo et al.
2018/0159129 A1     6/2018    Ide
                    (Continued)

FOREIGN PATENT DOCUMENTS

CN        111344811 A      6/2020
EP         4131502 A1      2/2023
                    (Continued)

OTHER PUBLICATIONS

International Search Report issued on Jul. 27, 2021 in International Patent Application No. PCT/JP2021/019273, with English translation.

(Continued)

*Primary Examiner* — Holly Rickman
*Assistant Examiner* — Linda N Chau
(74) *Attorney, Agent, or Firm* — Rimon P.C.

(57) ABSTRACT

A solid electrolyte material of the present disclosure consists of Li, M1, M2, and X. The M1 is one selected from the group consisting of Mg, Ca, Sr, Ba, and Zn. The M2 is at least one selected from the group consisting of Gd and Sm. The X is at least one selected from the group consisting of F, Cl, Br, and I. A battery of the present disclosure includes a positive electrode, a negative electrode, and an electrolyte layer provided between the positive electrode and the negative electrode. At least one selected from the group consisting of the positive electrode, the negative electrode, and the electrolyte layer includes the solid electrolyte material of the present disclosure.

8 Claims, 6 Drawing Sheets

(56)                    References Cited

U.S. PATENT DOCUMENTS

| 2019/0088995 | A1  | 3/2019  | Asano et al. |
| 2019/0140265 | A1* | 5/2019  | Miara .................... C01B 25/45 |
| 2020/0328460 | A1  | 10/2020 | Asano et al. |
| 2021/0328262 | A1  | 10/2021 | Nishio et al. |

FOREIGN PATENT DOCUMENTS

| JP | 2011-129312 | A  | 6/2011 |
| JP | 2018-092863 | A  | 6/2018 |
| WO | 2018/025582 | A1 | 2/2018 |
| WO | 2020/137189 | A1 | 7/2020 |

OTHER PUBLICATIONS

Extended European Search Report issued in Corresponding EP Application No. 21845617.6, dated Jan. 18, 2024.

* cited by examiner

SOLID ELECTROLYTE MATERIAL AND BATTERY USING SAME

This application is a continuation of PCT/JP2021/019273 filed on May 20, 2021, which claims foreign priority of Japanese Patent Application No. 2020-125309 filed on Jul. 22, 2020, the entire contents of both of which are incorporated herein by reference.

BACKGROUND OF THE INVENTION

1. Field of the Invention

The present disclosure relates to a solid electrolyte material and a battery using the same.

2. Description of Related Art

JP 2011-129312 A discloses an all-solid-state battery using a sulfide solid electrolyte.

WO 2018/025582 A1 discloses a solid electrolyte material represented by a composition formula $Li_{6-3z}Y_zX_6$ ($0<z<2$, X=Cl or Br).

SUMMARY OF THE INVENTION

The present disclosure aims to provide a novel solid electrolyte material having lithium-ion conductivity.

A solid electrolyte material of the present disclosure consists of:

Li;

M1;

M2; and

X, wherein the M1 is one selected from the group consisting of Mg, Ca, Sr, Ba, and Zn, the M2 is at least one selected from the group consisting of Gd and Sm, and the X is at least one selected from the group consisting of F, Cl, Br, and I.

The present disclosure provides a novel solid electrolyte material having lithium-ion conductivity.

DETAILED DESCRIPTION

Figure 1:
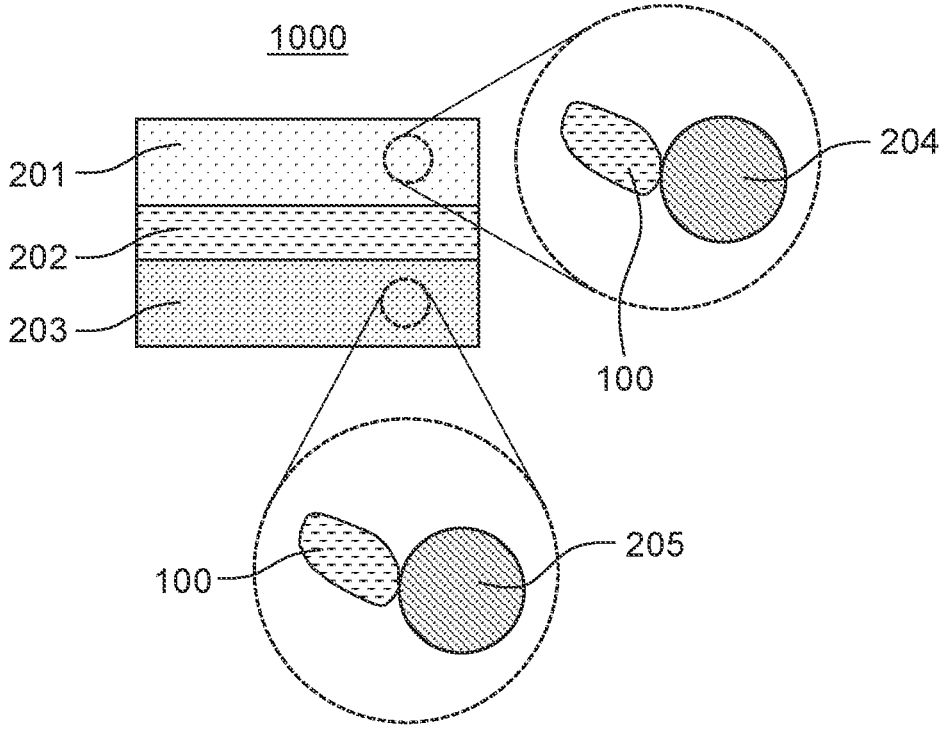
FIG. 1 shows a cross-sectional view of a battery 1000 according to a second embodiment.

Embodiments of the present disclosure will be described below with reference to the drawings.

First Embodiment

A solid electrolyte material according to a first embodiment consists of Li, M1, M2, and X. M1 is one selected from the group consisting of Mg, Ca, Sr, Ba, and Zn. M2 is at least one selected from the group consisting of Gd and Sm. X is at least one selected from the group consisting of F, Cl, Br, and I.

The solid electrolyte material according to the first embodiment is a novel solid electrolyte material having lithium-ion conductivity. The solid electrolyte material according to the first embodiment can have an ionic conductivity of, for example, $5.0 \times 10^{-5}$ S/cm or more near room temperature.

The solid electrolyte material according to the first embodiment can be used to achieve a battery having excellent charge and discharge characteristics. The battery is, for example, an all-solid-state battery. The all-solid-state battery may be a primary battery or a secondary battery.

It is desirable that the solid electrolyte material according to the first embodiment should be free of sulfur. Solid electrolyte materials free of sulfur generate no hydrogen sulfide when exposed to the atmosphere, and accordingly are excellent in safety. The sulfide solid electrolyte disclosed in JP 2011-129312 A can generate hydrogen sulfide when exposed to the atmosphere.

The solid electrolyte material according to the first embodiment may be free of Y (yttrium).

The solid electrolyte material according to the first embodiment may contain an element that is inevitably incorporated. The element is, for example, hydrogen, oxygen, or nitrogen. Such an element can be present in a raw material powder of the solid electrolyte material or in an atmosphere for manufacturing or storing the solid electrolyte material.

To enhance the ionic conductivity of the solid electrolyte material, M1 may be one selected from the group consisting of Mg, Ca, and Zn. X may be at least one selected from the group consisting of Cl and Br.

To further enhance the ionic conductivity of the solid electrolyte material, M1 may be Ca.

The solid electrolyte material according to the first embodiment may be a material represented by the following composition formula (1)

$$Li_{6-2a-3d}M1_a(Gd_{1-b}Sm_b)_dBr_{6-c}Cl_c \qquad (1), \text{wherein}$$

the following four mathematical relations are satisfied:

$$0<a\leq0.5;$$

$$0\leq b\leq0.7;$$

$$0\leq c\leq4; \text{ and}$$

$1\leq d\leq1.25$. According to the material represented by the composition formula (1), it is possible to further enhance the ionic conductivity of the solid electrolyte material.

To further enhance the ionic conductivity of the solid electrolyte material, in the composition formula (1), a mathematical relation $b\leq0.5$ may be satisfied.

To further enhance the ionic conductivity of the solid electrolyte material, in the composition formula (1), a mathematical relation $0.025\leq a\leq0.2$ may be satisfied.

The upper and lower limits for the range of the sign a in the composition formula (1) may be defined by any combination selected from numerical values more than 0 (i.e., $0<a$), 0.025, 0.05, 0.075, 0.1, 0.2, 0.25, and 0.5.

The upper and lower limits for the range of the sign b in the composition formula (1) may be defined by any combination selected from numerical values 0, 0.1, 0.3, 0.5, and 0.7.

The upper and lower limits for the range of the sign c in the composition formula (1) may be defined by any combination selected from numerical values 0, 3, and 4.

The upper and lower limits for the range of the sign d in the composition formula (1) may be defined by any combination selected from numerical values 1, 1.1, 1.2, and 1.25.

The X-ray diffraction pattern of the solid electrolyte material according to the first embodiment can be obtained by performing X-ray diffraction measurement according to a θ-2θ method with Cu-Kα radiation (wavelengths of 1.5405 Å and 1.5444 Å, i.e., wavelengths of 0.15405 nm and 0.15444 nm). In the obtained X-ray diffraction pattern, at least two peaks may be present within a range of a diffraction angle 2θ of 14.0° or more and 18.0° or less, and at least one peak may be present within a range of the diffraction angle 2θ of 29.0° or more and 32.0° or less. A crystalline phase having these peaks is referred to as a first crystalline phase. In a solid electrolyte material including the first crystalline phase, paths for diffusion of lithium ions are easily formed in the crystals. This enhances the ionic conductivity of the solid electrolyte material.

The first crystalline phase belongs to the trigonal system. The "trigonal system" in the present disclosure means a crystalline phase having a crystal structure similar to that of $Li_3ErCl_6$ disclosed in Inorganic Crystal Structure Database (ICSD), Collection Code 50151 and having an X-ray diffraction pattern specific to this structure. In the present disclosure, the phrase "having a similar crystal structure" means being classified into the same space group and having a close atomic configuration, and does not intend to limit the lattice constant.

In the X-ray diffraction pattern of the solid electrolyte material according to the first embodiment obtained by performing X-ray diffraction measurement with Cu-Kα radiation, at least one peak may be present within a range of the diffraction angle 2θ of 12.0° or more and 16.0° or less, and at least two peaks may be present within a range of the diffraction angle 2θ of 24.0° or more and 35.0° or less. A crystalline phase having these peaks is referred to as a second crystalline phase. In a solid electrolyte material including the second crystalline phase, paths for diffusion of lithium ions are easily formed in the crystals. This enhances the ionic conductivity of the solid electrolyte material.

The second crystalline phase belongs to the monoclinic system. The "monoclinic system" in the present disclosure means a crystalline phase having a crystal structure similar to that of $Li_3ErBr_6$ disclosed in Inorganic Crystal Structure Database (ICSD), Collection Code 50182 and having an X-ray diffraction pattern specific to this structure.

The solid electrolyte material according to the first embodiment may further include a third crystalline phase that is different from both the first crystalline phase and the second crystalline phase. In other words, the solid electrolyte material according to the first embodiment may further include the third crystalline phase whose peak is present outside the ranges of the diffraction angle 2θ described above. The third crystalline phase may lie between the first crystalline phase and the second crystalline phase. The third crystalline phase may belong to, for example, the cubic system. The "cubic system" in the present disclosure means a crystalline phase having a crystal structure similar to that of $Li_3YbCl_6$ disclosed in Inorganic Crystal Structure Database (ICSD), Collection Code 50152 and having an X-ray diffraction pattern specific to this structure.

The solid electrolyte material according to the first embodiment may be crystalline or amorphous. Alternatively, the solid electrolyte material according to the first embodiment may include both crystalline portions and amorphous portions. Here, the term "crystalline" refers to the presence of a peak in an X-ray diffraction pattern. The term "amorphous" refers to the presence of a broad peak (i.e., a halo) in an X-ray diffraction pattern. In the case where both amorphous portions and crystalline portions are included, a peak and a halo are present in an X-ray diffraction pattern.

To further enhance the ionic conductivity of the solid electrolyte material, in the X-ray diffraction pattern of the solid electrolyte material according to the first embodiment, a diffraction peak having the highest intensity (hereinafter referred to as the "maximum peak") that is attributed to the first crystalline phase (i.e., the trigonal system) or the second crystalline phase (i.e., the monoclinic system) may have a full width at half maximum of 0.30° or less.

The shape of the solid electrolyte material according to the first embodiment is not limited. The shape is, for example, acicular, spherical, or ellipsoidal. The solid electrolyte material according to the first embodiment may be in particle form. The solid electrolyte material according to the first embodiment may be formed to have a pellet shape or a plate shape.

In the case where the shape of the solid electrolyte material according to the first embodiment is, for example, particulate (e.g., spherical), the solid electrolyte material may have a median diameter of 0.1 μm or more and 100 μm or less. The median diameter means the particle diameter at a cumulative volume equal to 50% in the volumetric particle size distribution. The volumetric particle size distribution is measured, for example, with a laser diffraction measurement device or an image analysis device.

The solid electrolyte material according to the first embodiment may have a median diameter of 0.5 μm or more and 10 μm or less. In this case, it is possible to further enhance the ionic conductivity of the solid electrolyte material according to the first embodiment. Furthermore, in the case where the solid electrolyte material according to the first embodiment is mixed with another material such as an active material, a favorable dispersion state of the solid electrolyte material according to the first embodiment and the other material is achieved.

<Method of Manufacturing Solid Electrolyte Material>

The solid electrolyte material according to the first embodiment is manufactured, for example, by the following method.

Two or more halide raw material powders are mixed such that a target composition is achieved.

In an example, assume that the target composition of the solid electrolyte material is $Li_{2.8}Ca_{0.1}Gd_{0.9}Sm_{0.1}Br_2Cl_4$. In this case, raw material powders of LiBr, LiCl, $CaBr_2$, $GdCl_3$, $SmCl_3$ are mixed in the approximate molar ratio of LiBr:LiCl:$CaBr_2$:$GdCl_3$:$SmCl_3$=1.8:1:0.1:0.9:0.1. The raw material powders may be mixed in a molar ratio, where the molar ratio has been adjusted beforehand so as to offset a possible composition change in the synthesis process.

The mixture of the raw material powders is fired to be reacted with each other in an inert gas atmosphere to obtain a reaction product. The inert gas is, for example, helium, nitrogen, or argon. The firing may be performed in a vacuum. In the firing process, the mixture of the raw material powders may be put into a container (e.g., a crucible or a vacuum-sealed tube) for firing in a heating furnace.

Alternatively, the raw material powders may be reacted with each other mechanochemically in a mixer such as a planetary ball mill to obtain a reaction product. In other words, the raw material powders may be mixed and reacted with each other by the mechanochemical milling method. The reaction product thus obtained may be additionally fired in an inert gas atmosphere or in a vacuum.

By these methods, the solid electrolyte material according to the first embodiment is obtained.

Second Embodiment

A second embodiment will be described below. The matters described in the first embodiment can be omitted.

In the second embodiment, a description will be given on a battery using the solid electrolyte material according to the first embodiment.

The battery according to the second embodiment includes a positive electrode, a negative electrode, and an electrolyte layer. The electrolyte layer is provided between the positive electrode and the negative electrode. At least one selected from the group consisting of the positive electrode, the electrolyte layer, and the negative electrode includes the solid electrolyte material according to the first embodiment.

The battery according to the second embodiment includes the solid electrolyte material according to the first embodiment, and accordingly has excellent charge and discharge characteristics. The battery may be an all-solid-state battery.

FIG. 1 shows a cross-sectional view of a battery 1000 according to the second embodiment.

The battery 1000 according to the second embodiment includes a positive electrode 201, an electrolyte layer 202, and a negative electrode 203. The electrolyte layer 202 is provided between the positive electrode 201 and the negative electrode 203.

The positive electrode 201 includes positive electrode active material particles 204 and solid electrolyte particles 100.

The electrolyte layer 202 includes an electrolyte material. The electrolyte material is, for example, a solid electrolyte material.

The negative electrode 203 includes negative electrode active material particles 205 and the solid electrolyte particles 100.

The solid electrolyte particles 100 are particles formed of the solid electrolyte material according to the first embodiment or particles including the solid electrolyte material according to the first embodiment as a main component. Here, the term "the particles including the solid electrolyte material according to the first embodiment as a main component" means particles in which the component contained in the largest amount by molar ratio is the solid electrolyte material according to the first embodiment.

The solid electrolyte particles 100 may have a median diameter of 0.1 μm or more and 100 μm or less. In the case where the solid electrolyte particles 100 have a median diameter of 0.5 μm or more and 10 μm or less, the solid electrolyte particles 100 can have a further enhanced ionic conductivity.

The positive electrode 201 includes a material capable of occluding and releasing metal ions (e.g., lithium ions). The material is, for example, a positive electrode active material (e.g., the positive electrode active material particles 204).

Examples of the positive electrode active material include a lithium-containing transition metal oxide, a transition metal fluoride, a polyanion material, a fluorinated polyanion material, a transition metal sulfide, a transition metal oxyfluoride, a transition metal oxysulfide, and a transition metal oxynitride. Examples of the lithium-containing transition metal oxide include $Li(Ni, Co, Al)O_2$ and $LiCoO_2$.

In the present disclosure, an expression "(A, B, C)" in a chemical formula represents "at least one selected from the group consisting of A, B, and C". For example, "(Ni, Co, Al)" is synonymous with "at least one selected from the group consisting of Ni, Co, and Al".

The positive electrode active material particles 204 may have a median diameter of 0.1 μm or more and 100 μm or less. In the case where the positive electrode active material particles 204 have a median diameter of 0.1 μm or more, a favorable dispersion state of the positive electrode active material particles 204 and the solid electrolyte particles 100 is achieved in the positive electrode 201. This enhances the charge and discharge characteristics of the battery 1000. In the case where the positive electrode active material particles 204 have a median diameter of 100 μm or less, the diffusion rate of lithium in the positive electrode active material particles 204 is enhanced. This enables the battery 1000 to operate at a high output.

The positive electrode active material particles 204 may have a larger median diameter than the solid electrolyte particles 100. In this case, a favorable dispersion state of the positive electrode active material particles 204 and the solid electrolyte particles 100 is achieved in the positive electrode 201.

To enhance the energy density and the output of the battery 1000, the ratio of the volume of the positive electrode active material particles 204 to the sum of the volume of the positive electrode active material particles 204 and the volume of the solid electrolyte particles 100 in the positive electrode 201 may be 0.30 or more and 0.95 or less.

To enhance the energy density and the output of the battery 1000, the positive electrode 201 may have a thickness of 10 μm or more and 500 μm or less.

The electrolyte layer 202 includes an electrolyte material. The electrolyte material is, for example, the solid electrolyte material according to the first embodiment. The electrolyte layer 202 may be a solid electrolyte layer.

The electrolyte layer 202 may be composed only of the solid electrolyte material according to the first embodiment. Alternatively, the electrolyte layer 202 may be composed only of a solid electrolyte material different from the solid electrolyte material according to the first embodiment.

Examples of the solid electrolyte material different from the solid electrolyte material according to the first embodiment include $Li_2MgX'_4$, $Li_2FeX'_4$, $Li(Al, Ga, In)X'_4$, $Li_3(Al, Ga, In)X'_6$, and $LiI$, where X' is at least one selected from the group consisting of F, Cl, Br, and I. Thus, the solid electrolyte material different from the solid electrolyte material according to the first embodiment may be a solid electrolyte containing a halogen element, that is, a halide solid electrolyte.

Hereinafter, the solid electrolyte material according to the first embodiment is referred to as a first solid electrolyte material. The solid electrolyte material different from the solid electrolyte material according to the first embodiment is referred to as a second solid electrolyte material.

The electrolyte layer 202 may include the first solid electrolyte material, and in addition, the second solid electrolyte material. The first solid electrolyte material and the second solid electrolyte material may be uniformly dispersed in the electrolyte layer 202. A layer formed of the first solid electrolyte material and a layer formed of the second solid electrolyte material may be stacked in the stacking direction of the battery 1000.

The electrolyte layer 202 may have a thickness of 1 μm or more and 1000 μm or less. In the case where the electrolyte layer 202 has a thickness of 1 μm or more, a short-circuit between the positive electrode 201 and the negative electrode 203 tends not to occur. In the case where the electrolyte layer 202 has a thickness of 1000 μm or less, the battery 1000 can operate at a high output.

The negative electrode 203 includes a material capable of occluding and releasing metal ions such as lithium ions. The material is, for example, a negative electrode active material (e.g., the negative electrode active material particles 205).

Examples of the negative electrode active material include a metal material, a carbon material, an oxide, a nitride, a tin compound, and a silicon compound. The metal material may be a metal simple substance or an alloy. Examples of the metal material include lithium metal and a lithium alloy. Examples of the carbon material include natural graphite, coke, partially graphitized carbon, a carbon fiber, spherical carbon, artificial graphite, and amorphous carbon. From the viewpoint of capacity density, suitable examples of the negative electrode active material include silicon (i.e., Si), tin (i.e., Sn), a silicon compound, and a tin compound.

The negative electrode active material particles 205 may have a median diameter of 0.1 μm or more and 100 μm or less. In the case where the negative electrode active material particles 205 have a median diameter of 0.1 μm or more, a favorable dispersion state of the negative electrode active material particles 205 and the solid electrolyte particles 100 is achieved in the negative electrode 203. This enhances the charge and discharge characteristics of the battery 1000. In the case where the negative electrode active material particles 205 have a median diameter of 100 μm or less, the diffusion rate of lithium in the negative electrode active material particles 205 is enhanced. This enables the battery 1000 to operate at a high output.

The negative electrode active material particles 205 may have a larger median diameter than the solid electrolyte particles 100. In this case, a favorable dispersion state of the negative electrode active material particles 205 and the solid electrolyte particles 100 is achieved in the negative electrode 203.

To enhance the energy density and the output of the battery 1000, the ratio of the volume of the negative electrode active material particles 205 to the sum of the volume of the negative electrode active material particles 205 and the volume of the solid electrolyte particles 100 in the negative electrode 203 may be 0.30 or more and 0.95 or less.

To enhance the energy density and the output, the negative electrode 203 may have a thickness of 10 μm or more and 500 μm or less.

For the purpose of enhancing the ionic conductivity, the chemical stability, and the electrochemical stability, at least one selected from the group consisting of the positive electrode 201, the electrolyte layer 202, and the negative electrode 203 may include the second solid electrolyte material.

As described above, the second solid electrolyte material may be a halide solid electrolyte.

Examples of the halide solid electrolyte include $Li_2MgX'_4$, $Li_2FeX'_4$, $Li(Al, Ga, In)X'_4$, $Li_3(Al, Ga, In)X'_6$, and LiI, where X' is at least one selected from the group consisting of F, Cl, Br, and I.

The second solid electrolyte material may be a sulfide solid electrolyte.

Examples of the sulfide solid electrolyte include $Li_2S$—$P_2S_5$, $Li_2S$—$SiS_2$, $Li_2S$—$B_2S_3$, $Li_2S$—$GeS_2$, $Li_{3.25}Ge_{0.25}P_{0.75}S_4$, and $Li_{10}GeP_2S_{12}$.

The second solid electrolyte material may be an oxide solid electrolyte.

Examples of the oxide solid electrolyte include:
(i) a NASICON solid electrolyte such as $LiTi_2(PO_4)_3$ and element-substituted substances thereof;
(ii) a perovskite solid electrolyte such as $(LaLi)TiO_3$;
(iii) a LISICON solid electrolyte such as $Li_{14}ZnGe_4O_{16}$, $Li_4SiO_4$, and $LiGeO_4$ and element-substituted substances thereof;
(iv) a garnet solid electrolyte such as $Li_2La_3Zr_2O_{12}$ and element-substituted substances thereof; and
(v) $Li_3PO_4$ and N-substituted substances thereof.

The second solid electrolyte material may be a solid organic polymer electrolyte.

Examples of the solid organic polymer electrolyte include a compound of a polymer compound and a lithium salt. The polymer compound may have an ethylene oxide structure. A polymer compound having an ethylene oxide structure can contain a large amount of a lithium salt, thereby further enhancing the ionic conductivity.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these may be used alone. Alternatively, a mixture of two or more lithium salts selected from these may be used.

For the purpose of facilitating transfer of lithium ions and thereby enhancing the output characteristics of the battery 1000, at least one selected from the group consisting of the positive electrode 201, the electrolyte layer 202, and the negative electrode 203 may contain a nonaqueous electrolyte solution, a gel electrolyte, or an ionic liquid.

The nonaqueous electrolyte solution includes a nonaqueous solvent and a lithium salt dissolved in the nonaqueous solvent.

Examples of the nonaqueous solvent include a cyclic carbonate solvent, a linear carbonate solvent, a cyclic ether solvent, a linear ether solvent, a cyclic ester solvent, a linear ester solvent, and a fluorinated solvent. Examples of the cyclic carbonate solvent include ethylene carbonate, propylene carbonate, and butylene carbonate. Examples of the linear carbonate solvent include dimethyl carbonate, ethyl methyl carbonate, and diethyl carbonate. Examples of the cyclic ether solvent include tetrahydrofuran, 1,4-dioxane, and 1,3-dioxolane. Examples of the linear ether solvent include 1,2-dimethoxyethane and 1,2-diethoxyethane. Examples of the cyclic ester solvent include γ-butyrolactone. Examples of the linear ester solvent include methyl acetate. Examples of the fluorinated solvent include fluoroethylene carbonate, methyl fluoropropionate, fluorobenzene, fluoroethyl methyl carbonate, and fluorodimethylene carbonate. One nonaqueous solvent selected from these may be used alone. Alternatively, a mixture of two or more nonaqueous solvents selected from these may be used.

Examples of the lithium salt include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these may be used alone. Alternatively, a mixture of two or more lithium salts selected from these may be used. The concentration of the lithium salt is, for example, 0.5 mol/L or more and 2 mol/L or less.

As the gel electrolyte, a polymeric material impregnated with a nonaqueous electrolyte solution can be used. Examples of the polymeric material include polyethylene oxide, polyacrylonitrile, polyvinylidene fluoride, polymethyl methacrylate, and a polymer having an ethylene oxide bond.

Examples of cations contained in the ionic liquid include:

(i) aliphatic linear quaternary salts such as tetraalkylammonium and tetraalkylphosphonium;

(ii) aliphatic cyclic ammoniums such as pyrrolidiniums, morpholiniums, imidazoliniums, tetrahydropyrimidiniums, piperaziniums, and piperidiniums; and (iii) nitrogen-containing heterocyclic aromatic cations such as pyridiniums and imidazoliums.

Examples of anions contained in the ionic liquid include $PF_6^-$, $BF_4^-$, $SbF_6^-$, $AsF_6^-$, $SO_3CF_3^-$, $N(SO_2CF_3)_2^-$, $N(SO_2C_2F_5)_2^-$, $N(SO_2CF_3)(SO_2C_4F_9)^-$, and $C(SO_2CF_3)_3^-$. The ionic liquid may contain a lithium salt.

For the purpose of enhancing the adhesion between particles, at least one selected from the group consisting of the positive electrode 201, the electrolyte layer 202, and the negative electrode 203 may contain a binder.

Examples of the binder include polyvinylidene fluoride, polytetrafluoroethylene, polyethylene, polypropylene, an aramid resin, a polyamide, a polyimide, a polyamideimide, polyacrylonitrile, a polyacrylic acid, polyacrylic acid methyl ester, polyacrylic acid ethyl ester, polyacrylic acid hexyl ester, a polymethacrylic acid, polymethacrylic acid methyl ester, polymethacrylic acid ethyl ester, polymethacrylic acid hexyl ester, polyvinyl acetate, polyvinylpyrrolidone, a polyether, a polyethersulfone, hexafluoropolypropylene, styrene-butadiene rubber, and carboxymethyl cellulose. A copolymer can be used as the binder as well. Such a binder is, for example, a copolymer of two or more materials selected from the group consisting of tetrafluoroethylene, hexafluoroethylene, hexafluoropropylene, perfluoroalkyl vinyl ether, vinylidene fluoride, chlorotrifluoroethylene, ethylene, propylene, pentafluoropropylene, fluoromethyl vinyl ether, an acrylic acid, and hexadiene. A mixture of two or more selected from the above materials may be used as the binder.

To enhance the electronic conductivity, at least one selected from the group consisting of the positive electrode 201 and the negative electrode 203 may contain a conductive additive.

Examples of the conductive additive include:

(i) graphites such as natural graphite and artificial graphite;

(ii) carbon blacks such as acetylene black and Ketjen black;

(iii) conductive fibers such as a carbon fiber and a metal fiber;

(iv) fluorinated carbon;

(v) metal powders such as an aluminum powder;

(vi) conductive whiskers such as a zinc oxide whisker and a potassium titanate whisker;

(vii) a conductive metal oxide such as titanium oxide; and (viii) a conductive polymer compound such as a polyaniline compound, a polypyrrole compound, and a polythiophene compound. To reduce the cost, the conductive additive in (i) or (ii) above may be used.

Examples of the shape of the battery 1000 according to the second embodiment include a coin type, a cylindrical type, a prismatic type, a sheet type, a button type, a flat type, and a stacked type.

The battery 1000 according to the second embodiment may be manufactured, for example, by preparing a material for positive electrode formation, a material for electrolyte layer formation, and a material for negative electrode formation, and producing by a known method a stack including a positive electrode, an electrolyte layer, and a negative electrode that are disposed in this order.

EXAMPLES

The present disclosure will be described below in more detail with reference to examples and comparative examples.

Solid electrolyte materials of the examples are represented by the following composition formula (1).

$$Li_{6-2a-3d}M1_a(Gd_{1-b}Sm_b)_dBr_{6-c}Cl_c \qquad (1)$$

Example 1

(Production of Solid Electrolyte Material)

In an argon atmosphere with a dew point of −60° C. or less (hereinafter referred to as a dry argon atmosphere), raw material powders of $LiBr$, $LiCl$, $CaBr_2$, $GdCl_3$, and $SmCl_3$ were prepared in the molar ratio of $LiBr:LiCl:CaBr_2:GdCl_3:SmCl_3=1.8:1:0.1:0.9:0.1$. These raw material powders were pulverized and mixed in an agate mortar. The resulting mixture was put into an alumina crucible and fired in a dry argon atmosphere at 500° C. for 1 hour. The resulting fired product was pulverized in an agate mortar. Thus, a powder of the solid electrolyte material of Example 1 was obtained. The solid electrolyte material of Example 1 had a composition represented by $Li_{2.8}$ $Ca_{0.1}Gd_{0.9}Sm_{0.1}Br_2Cl_4$. As for the solid electrolyte material of Example 1, Table 1 shows the composition, the values corresponding to the signs a, b, c, and d in the composition formula (1), and the elemental species of M1.

(Evaluation of ionic conductivity)

Figure 2:
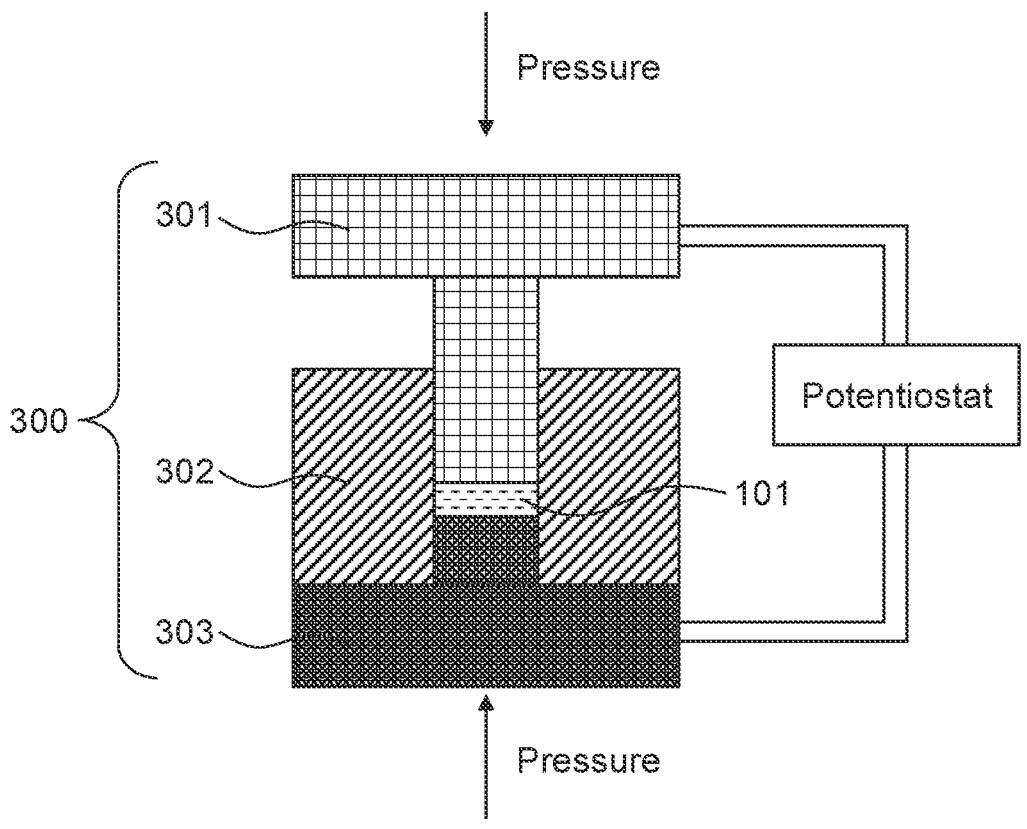
FIG. 2 shows a schematic view of a pressure-molding die 300 used to evaluate the ionic conductivity of a solid electrolyte material.

FIG. 2 shows a schematic view of a pressure-molding die 300 used to evaluate the ionic conductivity of the solid electrolyte material.

The pressure-molding die 300 included an upper punch 301, a die 302, and a lower punch 303. The upper punch 301 and the lower punch 303 were both formed of stainless steel, which is electronically conductive. The die 302 was formed of polycarbonate, which has an insulating property.

The pressure-molding die 300 shown in FIG. 2 was used to evaluate the ionic conductivity of the solid electrolyte material of Example 1 by the following method.

In a dry argon atmosphere, the pressure-molding die 300 was filled with a powder 101 of the solid electrolyte material of Example 1. Inside the pressure-molding die 300, a pressure of 360 MPa was applied to the powder 101 of the solid electrolyte material of Example 1 with the upper punch 301 and the lower punch 303.

While the pressure was applied, the upper punch 301 and the lower punch 303 were connected to a potentiostat (VersaSTAT4 manufactured by Princeton Applied Research) equipped with a frequency response analyzer. The upper punch 301 was connected to the working electrode and the potential measurement terminal. The lower punch 303 was connected to the counter electrode and the reference electrode. The impedance of the solid electrolyte material was measured at room temperature by the electrochemical impedance measurement method.

Figure 3:
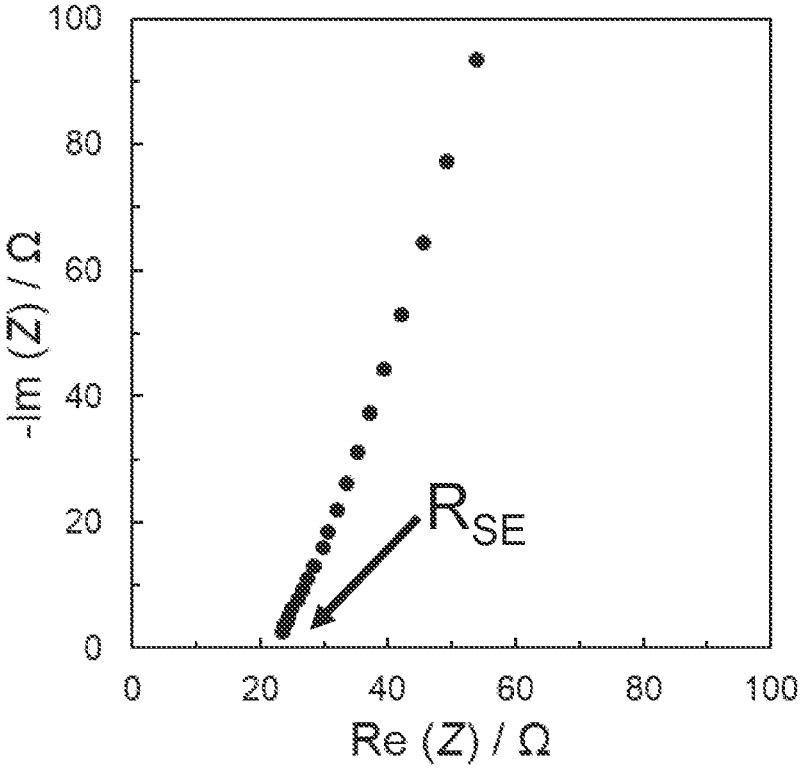
FIG. 3 is a graph showing the Cole-Cole plot obtained by AC impedance measurement for a solid electrolyte material of Example 1.

FIG. 3 is a graph showing the Cole-Cole plot obtained by impedance measurement for the solid electrolyte material of Example 1.

In FIG. 3, the real part of the complex impedance at the measurement point where the absolute value of the phase of the complex impedance was smallest was defined as the resistance value of the solid electrolyte material to ion conduction. For the real part, see an arrow $R_{SE}$ shown in FIG. 3. The resistance value was used to calculate the ionic conductivity based on the following mathematical equation (1).

$$\sigma = (R_{SE} \times S/t)^{-1} \tag{1}$$

Here, $\sigma$ represents the ionic conductivity. The sign S represents the contact area of the solid electrolyte material with the upper punch 301 (equal to the cross-sectional area of the cavity of the die 302 in FIG. 2). The sign $R_{SE}$ represents the resistance value of the solid electrolyte material in the impedance measurement. The sign t represents the thickness of the solid electrolyte material (i.e., the thickness of a layer formed of the powder 101 of the solid electrolyte material in FIG. 2).

The ionic conductivity of the solid electrolyte material according to Example 1 measured at 25° C. was $2.52 \times 10^{-3}$ S/cm. The measurement results are shown in Table 1.

(X-Ray Diffraction Measurement)

Figure 4:
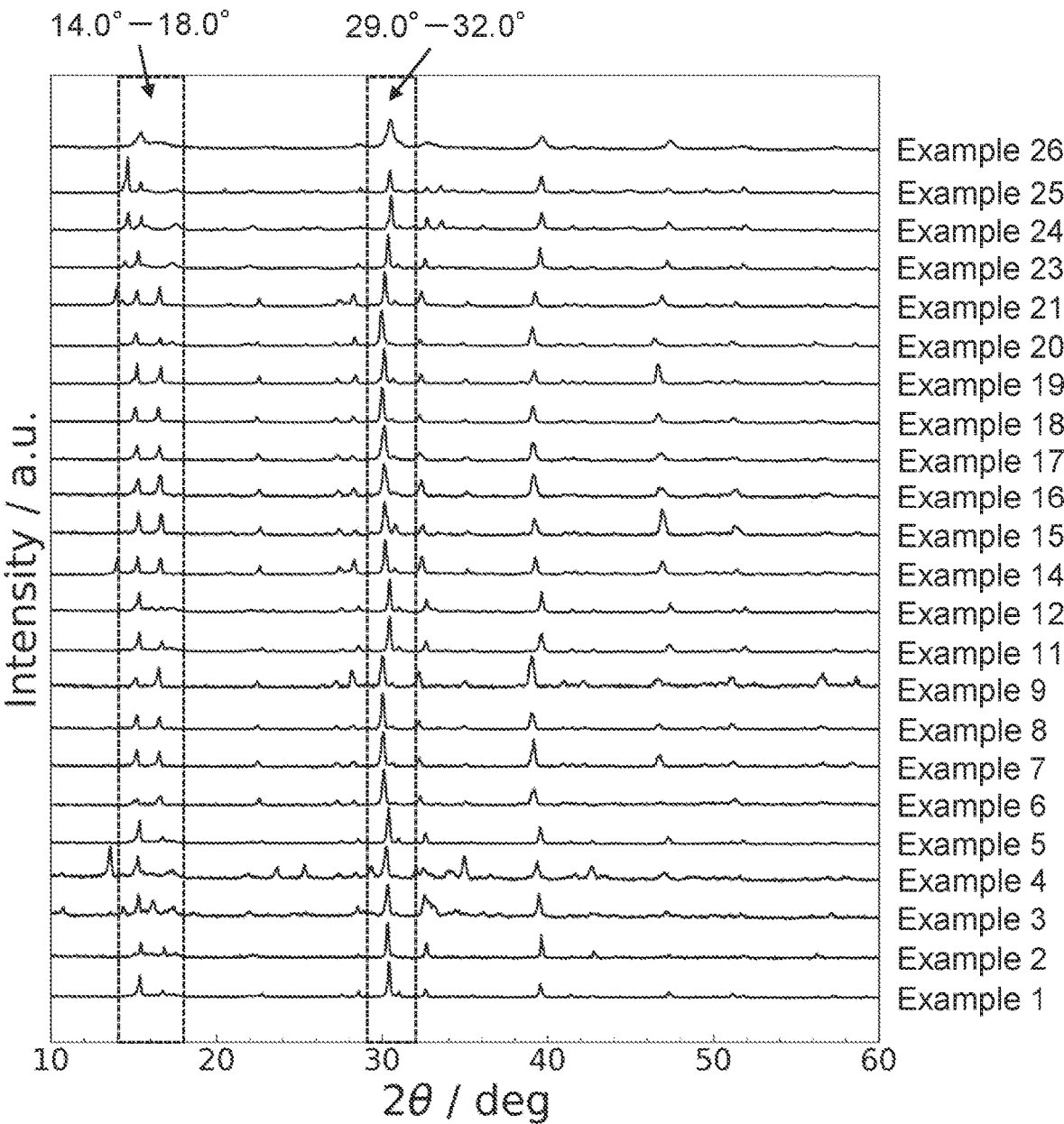
FIG. 4 is a graph showing the X-ray diffraction patterns of solid electrolyte materials of Examples 1 to 9, 11, 12, 14 to 21, and 23 to 26.

FIG. 4 is a graph showing the X-ray diffraction pattern of the solid electrolyte material of Example 1.

In a dry environment with a dew point of −50° C. or less, the X-ray diffraction pattern of the solid electrolyte material of Example 1 was measured by a θ-2θ method with an X-ray diffractometer (MiniFlex 600 manufactured by Rigaku Corporation). The X-ray source used was Cu-Kα radiation (wavelengths of 1.5405 Å and 1.5444 Å).

In the X-ray diffraction pattern of the solid electrolyte material of Example 1, at least one peak was present within a range of 29.0° or more and 32.0° or less, and two peaks were present within a range of 14.0° or more and 18.0° or less. Accordingly, the solid electrolyte material of Example 1 included the first crystalline phase (i.e., the trigonal system). A diffraction peak having the highest intensity (i.e., the maximum peak) in the X-ray diffraction pattern was present within the range of 29.0° or more and 32.0° or less, and had a full width at half maximum of 0.16°. The angles of the observed X-ray diffraction peaks and the full width at half maximum of the maximum peak are shown in Table 2.

(Production of Battery)

In a dry argon atmosphere, the solid electrolyte material of Example 1 and $LiCoO_2$ were prepared in the volume ratio of 30:70. These materials were mixed in a mortar to obtain a mixture.

In an insulating cylinder having an inner diameter of 9.5 mm, the solid electrolyte material of Example 1 (80 mg) and the above mixture (10 mg) were stacked in this order. A pressure of 720 MPa was applied to the resulting stack. Thus, a solid electrolyte layer formed of the solid electrolyte material of Example 1 was formed and a first electrode formed of the above mixture was formed. The solid electrolyte layer had a thickness of 400 μm.

Next, on the solid electrolyte layer, metallic In (thickness: 200 μm), metallic Li (thickness: 200 μm), and metallic In (thickness: 200 μm) were stacked sequentially. A pressure of 80 MPa was applied to the resulting stack to form a second electrode.

Next, current collectors formed of stainless steel were attached to the first electrode and the second electrode, and current collector leads were attached to the current collectors.

Lastly, an insulating ferrule was used to block the inside of the insulating cylinder from the outside air atmosphere and hermetically seal the cylinder. Thus, a battery of Example 1 was obtained.

(Charge and Discharge Test)

Figure 6:
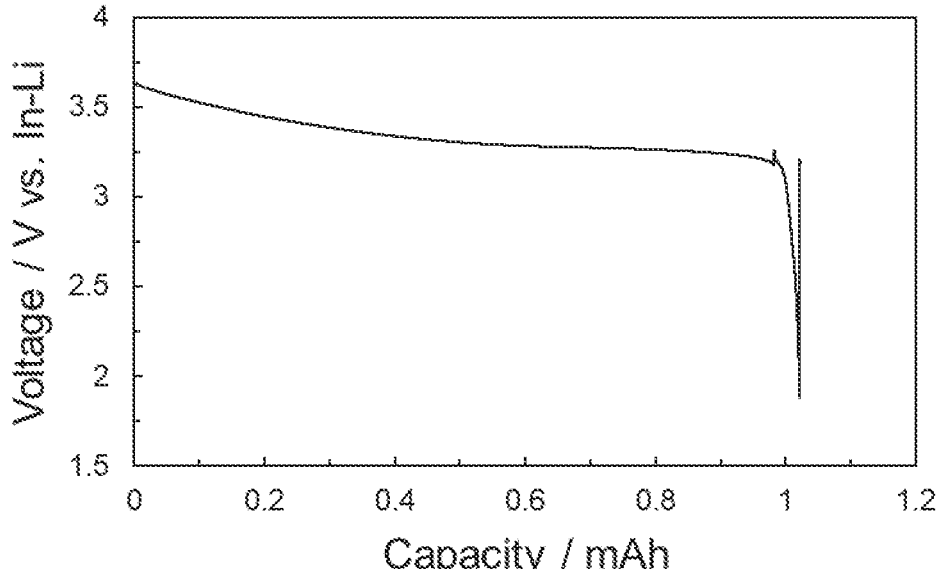
FIG. 6 is a graph showing the initial discharge characteristics of a battery of Example 1.

FIG. 6 is a graph showing the initial discharge characteristics of the battery of Example 1. The initial charge and discharge characteristics were measured by the following method.

The battery of Example 1 was placed in a thermostatic chamber set at 25° C.

The battery of Example 1 was charged to the voltage of 3.68 V at the current density of 76 μA/cm². The current density is equivalent to 0.05 C rate.

The battery of Example 1 was then discharged to the voltage of 1.88 V at the current density of 76 μA/cm².

The result of the charge and discharge test was that the battery of Example 1 had an initial discharge capacity of 1.02 mAh.

Examples 2 to 26

(Production of Solid Electrolyte Material)

In Example 2, raw material powders of LiBr, LiCl, $CaBr_2$, $GdCl_3$, and $SmCl_3$ were prepared in the molar ratio of $LiBr:LiCl:CaBr_2:GdCl_3:SmCl_3 = 2.8:1:0.1:0.7:0.3$.

In Example 3, raw material powders of LiBr, LiCl, $CaBr_2$, $GdCl_3$, and $SmCl_3$ were prepared in the molar ratio of $LiBr:LiCl:CaBr_2:GdCl_3:SmCl_3 = 1.8:1:0.1:0.5:0.5$.

In Example 4, raw material powders of LiBr, LiCl, $CaBr_2$, $GdCl_3$, and $SmCl_3$ were prepared in the molar ratio of $LiBr:LiCl:CaBr_2:GdCl_3:SmCl_3 = 1.8:1:0.1:0.3:0.7$.

In Example 5, raw material powders of LiBr, LiCl, $CaBr_2$, and $GdCl_3$ were prepared in the molar ratio of $LiBr:LiCl:CaBr_2:GdCl_3 = 1.8:1:0.1:1$.

In Example 6, raw material powders of LiBr, $CaBr_2$, $GdCl_3$, and $SmCl_3$ were prepared in the molar ratio of $LiBr:CaBr_2:GdCl_3:SmCl_3 = 2.8:0.1:0.9:0.1$.

In Example 7, raw material powders of LiBr, $CaBr_2$, $GdCl_3$, and $SmCl_3$ were prepared in the molar ratio of $LiBr:CaBr_2:GdCl_3:SmCl_3 = 2.8:0.1:0.7:0.3$.

In Example 8, raw material powders of LiBr, $CaBr_2$, $GdCl_3$, and $SmCl_3$ were prepared in the molar ratio of $LiBr:CaBr_2:GdCl_3:SmCl_3 = 2.8:0.1:0.5:0.5$.

In Example 9, raw material powders of LiBr, $CaBr_2$, and $GdCl_3$ were prepared in the molar ratio of $LiBr:CaBr_2:GdCl_3 = 2.8:0.1:1$.

In Example 10, raw material powders of LiBr, $CaBr_2$, $GdBr_3$, and $SmBr_3$ were prepared in the molar ratio of $LiBr:CaBr_2:GdBr_3:SmBr_3 = 2.8:0.1:0.9:0.1$.

In Example 11, raw material powders of LiBr, LiCl, $MgBr_2$, and $GdCl_3$ were prepared in the molar ratio of $LiBr:LiCl:MgBr_2:GdCl_3 = 1.8:1:0.1:1$.

In Example 12, raw material powders of LiBr, LiCl, $ZnBr_2$, and $GdCl_3$ were prepared in the molar ratio of $LiBr:LiCl:ZnBr_2:GdCl_3 = 1.8:1:0.1:1$.

In Example 13, raw material powders of LiBr, $MgBr_2$, $GdCl_3$, and $SmCl_3$ were prepared in the molar ratio of $LiBr:MgBr_2:GdCl_3:SmCl_3 = 2.8:0.1:0.9:0.1$.

In Example 14, raw material powders of LiBr, $ZnBr_2$, $GdCl_3$, and $SmCl_3$ were prepared in the molar ratio of $LiBr:ZnBr_2:GdCl_3:SmCl_3 = 2.8:0.1:0.9:0.1$.

In Example 15, raw material powders of LiBr, $CaBr_2$, and $GdCl_3$ were prepared in the molar ratio of $LiBr:CaBr_2:GdCl_3 = 2.95:0.025:1$.

In Example 16, raw material powders of LiBr, $CaBr_2$, and $GdCl_3$ were prepared in the molar ratio of $LiBr:CaBr_2:GdCl_3 = 2.9:0.05:1$.

In Example 17, raw material powders of LiBr, $CaBr_2$, and $GdCl_3$ were prepared in the molar ratio of $LiBr:CaBr_2:GdCl_3 = 2.85:0.075:1$.

In Example 18, raw material powders of LiBr, $CaBr_2$, and $GdCl_3$ were prepared in the molar ratio of LiBr:$CaBr_2$:$GdCl_3$=2.6:0.2:1.

In Example 19, raw material powders of LiBr, $CaBr_2$, and $GdCl_3$ were prepared in the molar ratio of LiBr:$CaBr_2$:$GdCl_3$=2.5:0.25:1.

In Example 20, raw material powders of LiBr, $CaBr_2$, and $GdCl_3$ were prepared in the molar ratio of LiBr:$CaBr_2$:$GdCl_3$=2:0.5:1.

In Example 21, raw material powders of LiBr, $ZnBr_2$, and $GdCl_3$ were prepared in the molar ratio of LiBr:$ZnBr_2$:$GdCl_3$=2.8:0.1:1.

In Example 22, raw material powders of LiBr, $ZnBr_2$, and $GdCl_3$ were prepared in the molar ratio of LiBr:$ZnBr_2$:$GdCl_3$=2.6:0.2:1.

In Example 23, raw material powders of LiBr, LiCl, $CaBr_2$, and $GdCl_3$ were prepared in the molar ratio of LiBr:LiCl:$CaBr_2$:$GdCl_3$=1.5:1:0.1:1.1.

In Example 24, raw material powders of LiBr, LiCl, $CaBr_2$, and $GdCl_3$ were prepared in the molar ratio of LiBr:LiCl:$CaBr_2$:$GdCl_3$=1.2:1:0.1:1.2.

In Example 25, raw material powders of LiBr, LiCl, $CaBr_2$, and $GdCl_3$ were prepared in the molar ratio of LiBr:LiCl:$CaBr_2$:$GdCl_3$=1.05:1:0.1:1.25.

The solid electrolyte materials of Examples 2 to 25 were obtained in a manner similar to that in Example 1 except for the above matters.

In Example 26, in a dry argon atmosphere, raw material powders of LiBr, LiCl, $CaBr_2$, and $GdCl_3$ were prepared in the molar ratio of LiBr:LiCl:$CaBr_2$:$GdCl_{3=1.8:1:0.1:1}$. These raw material powders were pulverized and mixed in a mortar. The resulting mixed powder was milled with a planetary ball mill at 600 rpm for 12 hours. Thus, the solid electrolyte material of Example 26 was obtained.

As for the solid electrolyte materials of Examples 2 to 26, Table 1 shows the composition, the values corresponding to the signs a, b, c, and d in the composition formula (1), and the elemental species of M1.

(Evaluation of Ionic Conductivity)

The ionic conductivity was measured for the solid electrolyte materials of Examples 2 to 26 in a manner similar to that in Example 1. The measurement results are shown in Table 1.

(X-Ray Diffraction Measurement)

The X-ray diffraction pattern was measured for the solid electrolyte materials of Examples 2 to 26 in a manner similar to that in Example 1.

FIG. 4 shows the X-ray diffraction patterns of the solid electrolyte materials of Examples 2 to 9, 11, 12, 14 to 21, and 23 to 26. The solid electrolyte materials of Examples 2 to 9, 11, 12, 14 to 21, and 23 to 26 all included the first crystalline phase. The maximum peaks of the solid electrolyte materials of Examples 2 to 9, 11, 12, 14 to 21, and 23 to 26 were present within a range of 29.0° or more and 32.0° or less. The angles of the observed X-ray diffraction peaks and the full width at half maximum of the maximum peak are shown in Table 2. In Example 26, moreover, a broad peak (halo) was observed at each of an angle near 29.0° or more and 32.0° or less and an angle near 14.0° or more and 18.0° or less. Accordingly, the solid electrolyte material of Example 26 is considered to have included amorphous portions.

Figure 5:
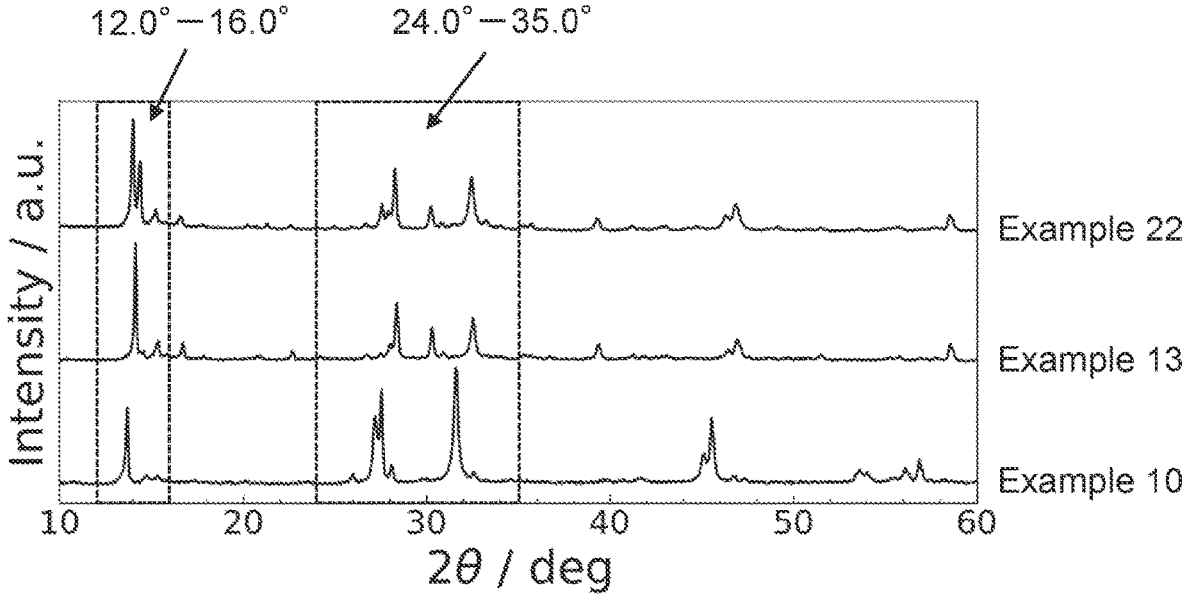
FIG. 5 is a graph showing the X-ray diffraction patterns of solid electrolyte materials of Examples 10, 13, and 22.

FIG. 5 shows the X-ray diffraction patterns of the solid electrolyte materials of Examples 10, 13, and 22. The solid electrolyte materials of Examples 10, 13, and 22 all included the second crystalline phase. The solid electrolyte materials of Examples 13 and 22 included the first crystalline phase as well as the second crystalline phase. The maximum peak of the solid electrolyte material of Example 10 was present within a range of 24.0° or more and 35.0° or less. The maximum peaks of the solid electrolyte materials of Examples 13 and 22 were present within a range of 12.0° or more and 16.0° or less. The difference between Example 10 and Examples 13 and 22 in position of the maximum peak is considered due to the difference therebetween in orientation of the sample at the time of the X-ray diffraction measurement. The angles of the observed X-ray diffraction peaks and the full width at half maximum of the maximum peak are shown in Table 3.

(Charge and Discharge Test)

Batteries of Examples 2 to 26 were obtained in a manner similar to that in Example 1 by using the solid electrolyte materials of Examples 2 to 26. A charge and discharge test was performed in a manner similar to that in Example 1 by using the batteries of Examples 2 to 26. The result was that the batteries of Examples 2 to 26 were favorably charged and discharged in a manner similar to the battery of Example 1.

Comparative Examples 1 and 2

(Production of Solid Electrolyte Material)

In Comparative Example 1, raw material powders of LiBr, LiCl, and $SmCl_3$ were prepared in the molar ratio of LiBr:LiCl:$SmCl_3$=2:1:1.

In Comparative Example 2, raw material powders of LiBr, and $SmCl_3$ were prepared in the molar ratio of LiBr:$SmCl_3$=3:1.

Solid electrolyte materials of Comparative Examples 1 and 2 were obtained in a manner similar to that in Example 1 except for the above matters.

As for the solid electrolyte materials of Comparative Examples 1 and 2, Table 1 shows the composition, the values corresponding to the signs a, b, c, and d in the composition formula (1), and the elemental species of M1.

(Evaluation of Ionic Conductivity)

The ionic conductivity was measured for the solid electrolyte materials of Comparative Examples 1 and 2 in a manner similar to that in Example 1. The measurement results are shown in Table 1.

TABLE 1

| | Composition | a | b | c | d | M1 | Ionic conductivity (S/cm) |
|---|---|---|---|---|---|---|---|
| Example 1 | $Li_{2.8}Ca_{0.1}Gd_{0.9}Sm_{0.1}Br_2Cl_4$ | 0.1 | 0.1 | 4 | 1 | Ca | $2.52 \times 10^{-3}$ |
| Example 2 | $Li_{2.8}Ca_{0.1}Gd_{0.7}Sm_{0.3}Br_2Cl_4$ | 0.1 | 0.3 | 4 | 1 | Ca | $1.52 \times 10^{-3}$ |
| Example 3 | $Li_{2.8}Ca_{0.1}Gd_{0.5}Sm_{0.5}Br_2Cl_4$ | 0.1 | 0.5 | 4 | 1 | Ca | $1.69 \times 10^{-4}$ |
| Example 4 | $Li_{2.8}Ca_{0.1}Gd_{0.3}Sm_{0.7}Br_2Cl_4$ | 0.1 | 0.7 | 4 | 1 | Ca | $9.23 \times 10^{-5}$ |

TABLE 1-continued

| | Composition | a | b | c | d | M1 | Ionic conductivity (S/cm) |
|---|---|---|---|---|---|---|---|
| Example 5 | $Li_{2.8}Ca_{0.1}GdBr_2Cl_4$ | 0.1 | 0 | 4 | 1 | Ca | $2.38 \times 10^{-3}$ |
| Example 6 | $Li_{2.8}Ca_{0.1}Gd_{0.9}Sm_{0.1}Br_3Cl_3$ | 0.1 | 0.1 | 3 | 1 | Ca | $4.02 \times 10^{-3}$ |
| Example 7 | $Li_{2.8}Ca_{0.1}Gd_{0.7}Sm_{0.3}Br_3Cl_3$ | 0.1 | 0.3 | 3 | 1 | Ca | $3.43 \times 10^{-3}$ |
| Example 8 | $Li_{2.8}Ca_{0.1}Gd_{0.5}Sm_{0.5}Br_3Cl_3$ | 0.1 | 0.5 | 3 | 1 | Ca | $2.93 \times 10^{-3}$ |
| Example 9 | $Li_{2.8}Ca_{0.1}GdBr_3Cl_3$ | 0.1 | 0 | 3 | 1 | Ca | $3.91 \times 10^{-3}$ |
| Example 10 | $Li_{2.8}Ca_{0.1}Gd_{0.9}Sm_{0.1}Br_6$ | 0.1 | 0.1 | 0 | 1 | Ca | $1.71 \times 10^{-3}$ |
| Example 11 | $Li_{2.8}Mg_{0.1}GdBr_2Cl_4$ | 0.1 | 0 | 4 | 1 | Mg | $1.04 \times 10^{-3}$ |
| Example 12 | $Li_{2.8}Zn_{0.1}GdBr_4Cl_4$ | 0.1 | 0 | 4 | 1 | Zn | $1.26 \times 10^{-3}$ |
| Example 13 | $Li_{2.8}Mg_{0.1}Gd_{0.9}Sm_{0.1}Br_3Cl_3$ | 0.1 | 0.1 | 3 | 1 | Mg | $1.34 \times 10^{-3}$ |
| Example 14 | $Li_{2.8}Zn_{0.1}Gd_{0.9}Sm_{0.1}Br_3Cl_3$ | 0.1 | 0.1 | 3 | 1 | Zn | $1.42 \times 10^{-3}$ |
| Example 15 | $Li_{2.95}Ca_{0.025}GdBr_3Cl_3$ | 0.025 | 0 | 3 | 1 | Ca | $4.59 \times 10^{-3}$ |
| Example 16 | $Li_{2.9}Ca_{0.05}GdBr_3Cl_3$ | 0.05 | 0 | 3 | 1 | Ca | $5.39 \times 10^{-3}$ |
| Example 17 | $Li_{2.85}Ca_{0.075}GdBr_3Cl_3$ | 0.075 | 0 | 3 | 1 | Ca | $4.97 \times 10^{-3}$ |
| Example 18 | $Li_{2.6}Ca_{0.2}GdBr_3Cl_3$ | 0.2 | 0 | 3 | 1 | Ca | $1.40 \times 10^{-3}$ |
| Example 19 | $Li_{2.5}Ca_{0.25}GdBr_3Cl_3$ | 0.25 | 0 | 3 | 1 | Ca | $9.08 \times 10^{-4}$ |
| Example 20 | $Li_2Ca_{0.5}GdBr_3Cl_3$ | 0.5 | 0 | 3 | 1 | Ca | $1.97 \times 10^{-4}$ |
| Example 21 | $Li_{2.8}Zn_{0.1}GdBr_3Cl_3$ | 0.1 | 0 | 3 | 1 | Zn | $1.30 \times 10^{-3}$ |
| Example 22 | $Li_{2.6}Zn_{0.2}GdBr_3Cl_3$ | 0.2 | 0 | 3 | 1 | Zn | $5.64 \times 10^{-4}$ |
| Example 23 | $Li_{2.5}Ca_{0.1}Gd_{1.1}Br_2Cl_4$ | 0.1 | 0 | 4 | 1.1 | Ca | $1.24 \times 10^{-3}$ |
| Example 24 | $Li_{2.2}Ca_{0.1}Gd_{1.2}Br_2Cl_4$ | 0.1 | 0 | 4 | 1.2 | Ca | $4.46 \times 10^{-4}$ |
| Example 25 | $Li_{2.05}Ca_{0.1}Gd_{1.25}Br_2Cl_4$ | 0.1 | 0 | 4 | 1.25 | Ca | $3.67 \times 10^{-4}$ |
| Example 26 | $Li_{2.8}Ca_{0.1}GdBr_2Cl_4$ | 0.1 | 0 | 4 | 1 | Ca | $6.14 \times 10^{-4}$ |
| Comparative Example 1 | $Li_3SmBr_2Cl_4$ | 0 | 1 | 4 | 1 | — | $3.47 \times 10^{-9}$ |
| Comparative Example 2 | $Li_3SmBr_3Cl_3$ | 0 | 1 | 3 | 1 | — | $1.93 \times 10^{-9}$ |

TABLE 2

| | Angle of peak attributed to first crystalline phase (°) | | Full width at half maximum of maximum peak attributed to first crystalline phase (°) |
|---|---|---|---|
| | 14.0° to 18.0° | 29.0° to 32.0° | |
| Example 1 | 15.38, 16.75 | 30.43 | 0.16 |
| Example 2 | 15.44, 16.84 | 30.34 | 0.17 |
| Example 3 | 15.28, 17.42 | 30.34 | 0.20 |
| Example 4 | 15.25, 17.34 | 30.25 | 0.24 |
| Example 5 | 15.36, 16.76 | 30.41 | 0.18 |
| Example 6 | 15.21, 16.64 | 30.12 | 0.20 |
| Example 7 | 15.21, 16.54 | 30.06 | 0.23 |
| Example 8 | 15.20, 16.54 | 30.05 | 0.19 |
| Example 9 | 15.18, 16.50 | 30.04 | 0.24 |
| Example 11 | 15.35, 16.72 | 30.45 | 0.20 |
| Example 12 | 15.34, 16.72 | 30.46 | 0.16 |
| Example 14 | 15.25, 16.64 | 30.20 | 0.20 |
| Example 15 | 15.28, 16.68 | 30.18 | 0.26 |
| Example 16 | 15.28, 16.60 | 30.15 | 0.28 |
| Example 17 | 15.21, 16.57 | 30.12 | 0.29 |
| Example 18 | 15.12, 16.50 | 30.02 | 0.21 |
| Example 19 | 15.20, 16.64 | 30.14 | 0.18 |
| Example 20 | 15.18, 16.60 | 29.99 | 0.23 |
| Example 21 | 15.20, 16.58 | 30.18 | 0.17 |
| Example 23 | 15.29, 17.35 | 30.37 | 0.15 |
| Example 24 | 15.47, 17.51 | 30.55 | 0.18 |
| Example 25 | 15.44, 17.55 | 30.48 | 0.18 |
| Example 26 | 15.45, 16.58 | 30.52 | 0.44 |

TABLE 3

| | Angle of diffraction peak (°) | | | | Full width at half |
|---|---|---|---|---|---|
| | 12.0° to 16.0° | | 24.0° to 35.0° | | |
| | Peak attributed to second crystalline phase | Peak attributed to first crystalline phase | Peak attributed to second crystalline phase | Peak attributed to first crystalline phase | maximum of maximum peak attributed to second crystalline phase (°) |
| Example 10 | 13.70 | — | 28.12, 31.61 | — | 0.26 |
| Example 13 | 14.14 | 15.37, 16.72 | 28.40, 32.54 | 30.32 | 0.12 |
| Example 22 | 14.01 | 15.24, 16.62 | 28.30, 32.47 | 30.26 | 0.18 |

<Consideration>

The solid electrolyte materials of Examples 1 to 26 had a lithium-ion conductivity of $5.0 \times 10^{-5}$ S/cm or more near room temperature.

As is obvious from comparing Examples 1 to 26 with Comparative Examples 1 and 2, the solid electrolyte materials, which are represented by the composition formula (1) and includes M1, had a remarkably enhanced ionic conductivity compared with the solid electrolyte materials, which are free of M1. This is considered due to an easy formation of paths for diffusion of lithium ions in the solid electrolyte materials, which are represented by the composition formula (1) and include M1.

As is obvious from Examples 1 to 5, the solid electrolyte materials, in which the value of the sign b is 0 or more and 0.7 or less, had an enhanced ionic conductivity. This is considered due to an easy formation of paths for diffusion of lithium ions. As is obvious from comparing Examples 1 to 3 and 5 with Example 4, the solid electrolyte materials, in which the value of the sign b is 0 or more and 0.5 or less, had a further enhanced ionic conductivity. This is considered due to an easier formation of paths for diffusion of lithium ions. As is obvious from comparing Examples 1, 2, and 5 with Example 3, the solid electrolyte materials, in which the value of the sign b is 0 or more and 0.3 or less, had an even further enhanced ionic conductivity. This is considered due to an even easier formation of paths for diffusion of lithium ions and thus an achievement of the paths having an optimal size for ion conduction.

As is obvious from Examples 1, 6, and 10, the solid electrolyte materials, in which the value of the sign c is 0 or more and 4 or less, had an enhanced ionic conductivity. This is considered due to an easy formation of paths for diffusion of lithium ions. As is obvious from comparing Examples 1 and 6 with Example 10, the solid electrolyte materials, in which the value of the sign c is 3 or more and 4 or less, had a further enhanced ionic conductivity. This is considered due to an easy formation of the first crystalline phase.

As is obvious from Examples 5, 6, and 11 to 14, the solid electrolyte materials, in which M1 is one selected from the group consisting of Mg, Ca, and Zn, had an enhanced ionic conductivity. This is considered due to an easy formation of paths for diffusion of lithium ions. As is obvious from comparing Examples 5 and 6 with Examples 11 to 14, the solid electrolyte materials, in which M1 is Ca, had a further enhanced ionic conductivity. This is considered due to an easy optimization of paths for diffusion of lithium ions.

As is obvious from Examples 9 and 15 to 20, the solid electrolyte materials, in which the value of the sign a is more than 0 and 0.5 or less, had an enhanced ionic conductivity. This is considered due to an easy formation of paths for diffusion of lithium ions. As is obvious from comparing Examples 9 and 15 to 18 with Examples 19 and 20, the solid electrolyte materials, in which the value of the sign a is 0.025 or more and 0.2 or less, had a further enhanced ionic conductivity. This is considered due to an optimization of the amount of lithium ions in the crystals. As is obvious from comparing Examples 9 and 15 to 17 with Examples 18 and 19, the solid electrolyte materials, in which the value of the sign a is 0.025 or more and 0.1 or less, had an even further enhanced ionic conductivity. This is considered due to a further optimization of the amount of lithium ions in the crystals.

As is obvious from Examples 5 and 23 to 25, the solid electrolyte materials, in which the value of the sign d is 1 or more and 1.25 or less, had an enhanced ionic conductivity. This is considered due to an easy formation of paths for diffusion of lithium ions. Furthermore, as is obvious from comparing Examples 1 and 23 with Examples 24 and 25, the solid electrolyte materials, in which the value of the sign d is 1 or more and 1.1 or less, had a further enhanced ionic conductivity. This is considered due to an easier formation of paths for diffusion of lithium ions.

As is obvious from the full widths at half maximum of the diffraction peaks of Examples 1 to 26, whichever the solid electrolyte materials are crystalline or include both amorphous portions and crystalline portions, the solid electrolyte materials had an enhanced ionic conductivity. Furthermore, as is obvious from comparing Example 5 with Example 26, the solid electrolyte material, in which the full width at half maximum of the maximum peak is 0.30 or less, had a further enhanced ionic conductivity. This is considered due to an easier formation of paths for diffusion of lithium ions.

The batteries of Examples 1 to 26 were all charged and discharged at room temperature.

The solid electrolyte materials of Examples 1 to 26 were free of sulfur, and accordingly generated no hydrogen sulfide.

It should be noted that a solid electrolyte material in which M1 is Sr or Ba in the composition formula (1) can be expected to exert effects similar to those of the solid electrolyte materials of the examples in which M1 is Ca or Mg in the composition formula (1). This is because Sr and Ba belong to the same element group as Ca and Mg.

As described above, the solid electrolyte material according to the present disclosure is a novel solid electrolyte material having lithium-ion conductivity. The solid electrolyte material according to the present disclosure is suitable for providing a battery capable of being favorably charged and discharged.

INDUSTRIAL APPLICABILITY

The solid electrolyte material of the present disclosure is utilized, for example, in a battery (e.g., an all-solid-state lithium-ion secondary battery).

What is claimed is:

1. A solid electrolyte material being represented by the following composition formula (1)

$$\text{Li}_{6-2a-3d}\text{M1}_a(\text{Gd}_{1-b}\text{Sm}_b)_d\text{Br}_{6-c}\text{Cl}_c \qquad (1), \text{wherein}$$

the M1 is one selected from the group consisting of Mg, Ca, and Zn, and the following four mathematical relations are satisfied:

$0.025 \le a \le 0.2$;

$0 \le b \le 0.5$;

$0 \le c \le 4$; and $1 \le d \le 1.25$.

2. The solid electrolyte material according to claim 1, wherein the M1 is Ca.

3. The solid electrolyte material according to claim 1, wherein in an X-ray diffraction pattern obtained by performing X-ray diffraction measurement with Cu-Kα radiation on the solid electrolyte material, at least two peaks are present within a range of a diffraction angle 2θ of 14.0° or more and 18.0° or less, and at least one peak is present within a range of the diffraction angle 2θ of 29.0° or more and 32.0° or less.

4. The solid electrolyte material according to claim 1, comprising a crystalline phase belonging to a trigonal system.

5. The solid electrolyte material according to claim 1, wherein

19

20 in an X-ray diffraction pattern obtained by performing X-ray diffraction measurement with Cu-Kα radiation on the solid electrolyte material, at least one peak is present within a range of a diffraction angle 2θ of 12.0° or more and 16.0° or less, and at least two peaks are present within a range of the diffraction angle 2θ of 24.0° or more and 35.0° or less.

6. The solid electrolyte material according to claim 1, comprising a crystalline phase belonging to a monoclinic system.

7. The solid electrolyte material according to claim 1, wherein in an X-ray diffraction pattern obtained by performing X-ray diffraction measurement with Cu-Kα radiation on the solid electrolyte material, a peak having a highest intensity has a full width at half maximum of 0.300 or less.

8. A battery comprising:

a positive electrode;

a negative electrode; and an electrolyte layer provided between the positive electrode and the negative electrode, wherein at least one selected from the group consisting of the positive electrode, the negative electrode, and the electrolyte layer comprises the solid electrolyte material according to claim 1.

* * * * *